United States Patent
Ishikawa

(10) Patent No.: US 11,888,353 B2
(45) Date of Patent: Jan. 30, 2024

(54) MOTOR, COMPRESSOR, AND AIR CONDITIONER

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 683 days.

(21) Appl. No.: 17/042,545

(22) PCT Filed: Apr. 10, 2018

(86) PCT No.: PCT/JP2018/014989
§ 371 (c)(1),
(2) Date: Sep. 28, 2020

(87) PCT Pub. No.: WO2019/198138
PCT Pub. Date: Oct. 17, 2019

(65) Prior Publication Data
US 2021/0036562 A1  Feb. 4, 2021

(51) Int. Cl.
*H02K 1/27* (2022.01)
*F25B 1/04* (2006.01)
(Continued)

(52) U.S. Cl.
CPC ............. *H02K 1/2766* (2013.01); *F25B 1/04* (2013.01); *H02K 1/278* (2013.01); *H02K 21/14* (2013.01);
(Continued)

(58) Field of Classification Search
CPC ...... H02K 1/278; H02K 21/14; H02K 1/2766; H02K 1/276; H02K 2201/03; H02K 2213/03; F25B 1/04
(Continued)

(56) References Cited

U.S. PATENT DOCUMENTS 6,774,523 B2 * 8/2004 Ahn ..................... H02K 1/2766
310/156.01
6,952,064 B2 * 10/2005 Hiwaki ................. H02K 15/022
310/214
(Continued)

FOREIGN PATENT DOCUMENTS

CN 1976171 A 6/2007
CN 102403862 A 4/2012
(Continued)

OTHER PUBLICATIONS

International Search Report of the International Searching Authority dated Jul. 10, 2018 for the corresponding international application No. PCT/JP2018/014989 (and English translation).
(Continued)

*Primary Examiner* — Alex W Mok
(74) *Attorney, Agent, or Firm* — POSZ LAW GROUP, PLC

(57) ABSTRACT

A motor includes a rotor rotatable about a rotation axis, and a stator surrounding the rotor so as to form an air gap between the stator and the rotor. The rotor has a rotor core having a magnet insertion hole and a rare earth magnet provided in the magnet insertion hole. The rotor core has a plurality of slits on an outer side of the magnet insertion hole in a radial direction about the rotation axis. Each of the plurality of slits has a length in the radial direction which is longer than a length in a circumferential direction about the rotation axis. The plurality of slits have a uniform minimum distance to the magnet insertion hole. When the minimum distance is expressed as T and the air gap is expressed as G, $2.75 \leq T/G \leq 5.25$ is satisfied.

16 Claims, 16 Drawing Sheets

(51) Int. Cl.
*H02K 21/14* (2006.01)
*H02K 1/276* (2022.01)
*H02K 1/278* (2022.01)

(52) U.S. Cl.
CPC ..... *H02K 2201/03* (2013.01); *H02K 2213/03* (2013.01)

(58) Field of Classification Search
USPC .................................................. 310/156.56
See application file for complete search history.

(56) References Cited

U.S. PATENT DOCUMENTS

| | | | | |
|---|---|---|---|---|
| 8,740,584 | B2* | 6/2014 | Yoshino | H02K 1/28 310/60 A |
| 2007/0126304 | A1 | 6/2007 | Ito et al. | |
| 2012/0060547 | A1 | 3/2012 | Fujisue et al. | |
| 2012/0242182 | A1* | 9/2012 | Yabe | H02K 1/276 310/156.53 |
| 2013/0140933 | A1* | 6/2013 | Katsuhisa | H02K 1/276 310/156.08 |
| 2015/0256038 | A1 | 9/2015 | Nigo et al. | |
| 2016/0276886 | A1 | 9/2016 | Baba et al. | |
| 2016/0315512 | A1 | 10/2016 | Fubuki | |
| 2016/0329787 | A1* | 11/2016 | Ito | H02P 21/0003 |
| 2017/0070109 | A1 | 3/2017 | Nigo et al. | |
| 2017/0117762 | A1 | 4/2017 | Takahata et al. | |

FOREIGN PATENT DOCUMENTS

| | | |
|---|---|---|
| CN | 204633491 U | 9/2015 |
| CN | 207134898 U | 3/2018 |
| JP | H11-206051 A | 7/1999 |
| JP | 2000-156946 A | 6/2000 |
| JP | 2000-188837 A | 7/2000 |
| JP | 2001-178045 A | 6/2001 |
| JP | 2005-354899 A | 12/2005 |
| JP | 2008-187778 A | 8/2008 |
| JP | 2011-097754 A | 5/2011 |
| JP | 2013-255321 A | 12/2013 |
| JP | 2014-187748 A | 10/2014 |
| JP | 2015-116105 A | 6/2015 |
| JP | 2015-208053 A | 11/2015 |
| JP | 6109338 B2 | 4/2017 |
| JP | 2017-194064 A | 10/2017 |
| JP | 2018-057155 A | 4/2018 |
| WO | 2014/069438 A1 | 5/2014 |

OTHER PUBLICATIONS

Office Action dated Apr. 26, 2023 in connection with counterpart Chinese Patent Application No. 201880091583.X (and English machine translation).

Office Action dated Mar. 3, 2023 in connection with counterpart Chinese Patent Application No. 201880091583.X (and English machine translation).

Office Action dated Sep. 29, 2022 in connection with counterpart Chinese Patent Application No. 201880091583.X (and English machine translation).

Office Action dated Jun. 15, 2021 issued in corresponding JP Patent Application No. 2020-512962 ( and English translation).

Office Action dated Jul. 27, 2023 in connection with counterpart Chinese Patent Application No. 201880091583.X (and English machine translation).

* cited by examiner

MOTOR, COMPRESSOR, AND AIR CONDITIONER

CROSS REFERENCE TO RELATED APPLICATION

This application is a U.S. national stage application of International Patent Application No. PCT/JP2018/014989 filed on Apr. 10, 2018, the disclosure of which is incorporated herein by reference.

TECHNICAL FIELD

The present invention relates to a motor, a compressor, and an air conditioner.

BACKGROUND

Large-sized air conditioners, such as commercial air conditioners, are required to have an increased capacity of a compressor. In order to increase the capacity of the compressor, it is necessary to enlarge the stroke volume of the compressor and increase the rotation speed of a motor. When the rotation speed of the motor is increased, the frequency of a current flowing through a coil of the motor increases. Thus, in a permanent magnet embedded motor using a rare earth magnet as a permanent magnet, the efficiency of the motor is reduced due to an eddy current generated in the permanent magnet.

In order to reduce the eddy current in a permanent magnet, Patent reference 1 proposes inserting the permanent magnet into a hole formed by punching a steel sheet with an insulating film. Furthermore, Patent reference 2 proposes dividing a permanent magnet in the axial direction and providing an insulating layer between the divided parts of the permanent magnet.

PATENT REFERENCE

Patent Reference 1: Japanese Patent Application Publication No. 2015-116105 (see FIG. 1)
Patent Reference 2: Japanese Patent Application Publication No. 2005-354899 (see FIG. 2)

However, when the steel sheet with the insulating film is used as in patent reference 1, the manufacturing cost increases. Further, when the permanent magnet is divided as in patent reference 2, the number of magnets increases and the processing cost increases, and thus the manufacturing cost also increases.

SUMMARY

The present invention is intended to solve the above described problems, and an object of the present invention is to reduce eddy current loss without increasing the manufacturing cost.

A motor of the present invention includes a rotor rotatable about a rotation axis, and a stator surrounding the rotor so as to form an air gap between the stator and the rotor. The rotor has a rotor core having a magnet insertion hole and a rare earth magnet disposed in the magnet insertion hole. The rotor core has a plurality of slits on an outer side of the magnet insertion hole in a radial direction about the rotation axis. Each of the plurality of slits has a length in the radial direction which is longer than a length in a circumferential direction about the rotation axis. The plurality of slits have a uniform minimum distance to the magnet insertion hole. When the minimum distance is expressed as T and the air gap is expressed as G, $2.75 \leq T/G \leq 5.25$ is satisfied.

In the present invention, the eddy current can be reduced because the plurality of slits have the uniform distance to the magnet insertion hole, and the relationship of $2.75 \leq T/G \leq 5.25$ is satisfied between the distance T and the air gap G. Furthermore, since there is no need to divide the rare earth magnet, the manufacturing cost can be reduced.

DETAILED DESCRIPTION

First Embodiment

Configuration of Motor

Figure 1A:
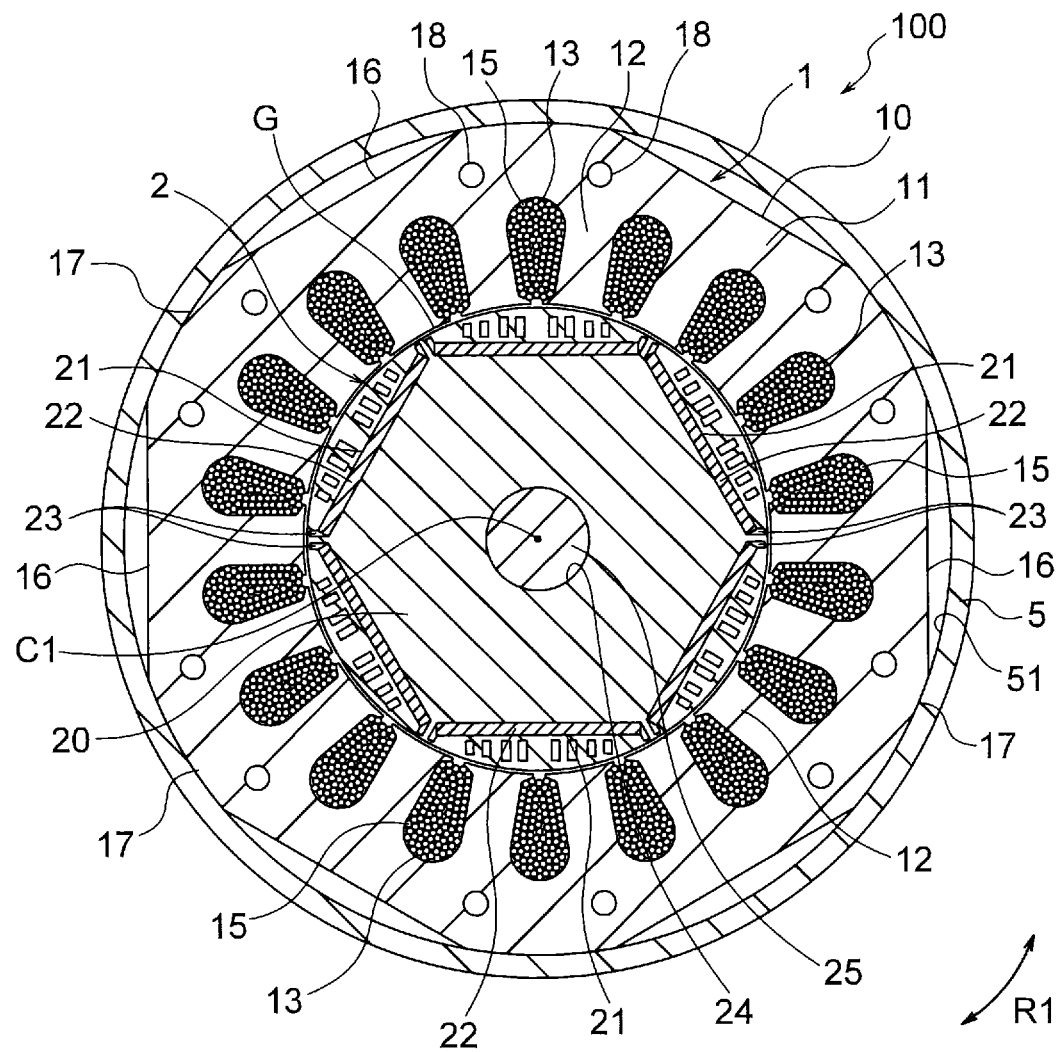
FIG. 1(A) is a cross-sectional view illustrating a motor of a first embodiment.

FIG. 1(A) is a cross-sectional view illustrating a motor 100 of a first embodiment. The motor 100 illustrated in FIG. 1(A) is incorporated inside a cylindrical shell 5. The shell 5 is a part of a container of a compressor 500 (FIG. 15) in which the motor 100 is incorporated.

The motor 100 includes a rotatable rotor 2 and a stator 1 provided so as to surround the rotor 2. The stator 1 is assembled inside the above-described shell 5. An air gap (i.e., a gap) of, for example, 0.5 mm is provided between the stator 1 and the rotor 2.

Hereinafter, a direction of the axis C1, which is a rotation axis of the rotor 2, is referred to as an "axial direction". A direction along a circumference about the axis C1 is referred to as a "circumferential direction". A radial direction about the axis C1 is referred to as a "radial direction". FIG. 1 is a cross-sectional view at a plane perpendicular to the axis C1.

Configuration of Stator

The stator 1 includes a stator core 10 and windings 15 wound on the stator core 10. The stator core 10 is formed of a plurality of stack elements which are stacked in the axial direction and fastened by crimping or the like. For example, an electromagnetic steel sheet having a thickness of 0.25 to 0.5 mm and subjected to punching is used as the stack element.

The stator core 10 has a yoke 11 having an annular shape about the axis C1 and a plurality of teeth 12 protruding from the yoke 11 inward in the radial direction. The number of teeth 12 is 18 in this example, but is not limited to 18. The winding 15 is wound around the tooth 12 of the stator core 10 via a not shown insulating portion (insulator). Slots 13 for accommodating the windings 15 are formed each between the teeth 12 adjacent to each other in the circumferential direction.

Figure 1B:
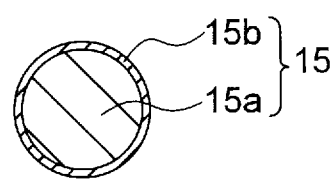
FIG. 1(B) is a schematic diagram illustrating a cross-sectional structure of a winding.

FIG. 1(B) is a schematic diagram illustrating a cross-sectional structure of the winding 15. The winding 15 has a conductor 15a made of aluminum or copper, and a refrigerant-resistant insulating film 15b covering a circumference of the conductor 15a. Since the winding 15 is in contact with refrigerant inside the compressor 500 (FIG. 15), the conductor 15a is protected by the refrigerant-resistant insulating film 15b. A way to wind the winding 15 may be either distributed winding in which the winding 15 is wound across a plurality of teeth 12 or concentrated winding in which the winding 15 is wound around each tooth 12.

A plurality of abutting surfaces 17 which are cylindrical surfaces about the axis C1 and a plurality of cutout portions 16 which are flat surfaces parallel to the axis C1 are formed on an outer circumference of the stator core 10. The plurality of abutting surfaces 17 and the plurality of cutout portions 16 are alternately formed in the circumferential direction. Each of the number of the abutting surfaces 17 and the number of the cutout portions 16 is 6 in this example, but is not limited to 6.

The abutting surfaces 17 are fitted to an inner circumferential surface 51 of the shell 5. Thus, the motor 100 is attached to the shell 5. A gap is formed between each cutout portion 16 and the inner circumferential surface 51 of the shell 5. The gap serves as a refrigerant flow passage as will be described later.

Configuration of Rotor

The rotor 2 has a rotor core 20 having a plurality of magnet insertion holes 21 formed therein, and permanent magnets 22 disposed in the magnet insertion holes 21. The rotor core 20 is formed of the stack elements which are stacked in the axial direction and fastened by crimping or the like. For example, the stack element is obtained by punching an electromagnetic steel sheet having a thickness of 0.25 to 0.5 mm.

The rotor core 20 has an outer circumferential surface having a cylindrical shape about the axis C1. A shaft hole 24 is formed at a center of the rotor core 20 in the radial direction. A rotational shaft 25 is fixed into the shaft hole 24 by press-fitting.

The magnet insertion holes 21 are formed along an outer circumference of the rotor core 20 and pass through the rotor core 20 in the axial direction. The number of magnet insertion holes 21 is six. The magnet insertion holes 21 are formed at equal intervals in the circumferential direction of the rotor core 20. In an example illustrated in FIG. 1(A), one magnet insertion hole 21 faces three slots 13 in the stator 1, but the rotor is not limited to such a configuration.

One permanent magnet 22 is disposed in each of the magnet insertion holes 21. The permanent magnet 22 constitutes a magnetic pole of the rotor 2, and the number of permanent magnets 22 is the same as the number of poles of the rotor 2. That is, the number of magnetic poles of the rotor 2 is six in this example. The number of magnetic poles of the rotor 2 is not limited to six, and it is sufficient that the number of magnetic poles of the rotor 2 is two or more.

Figure 2:
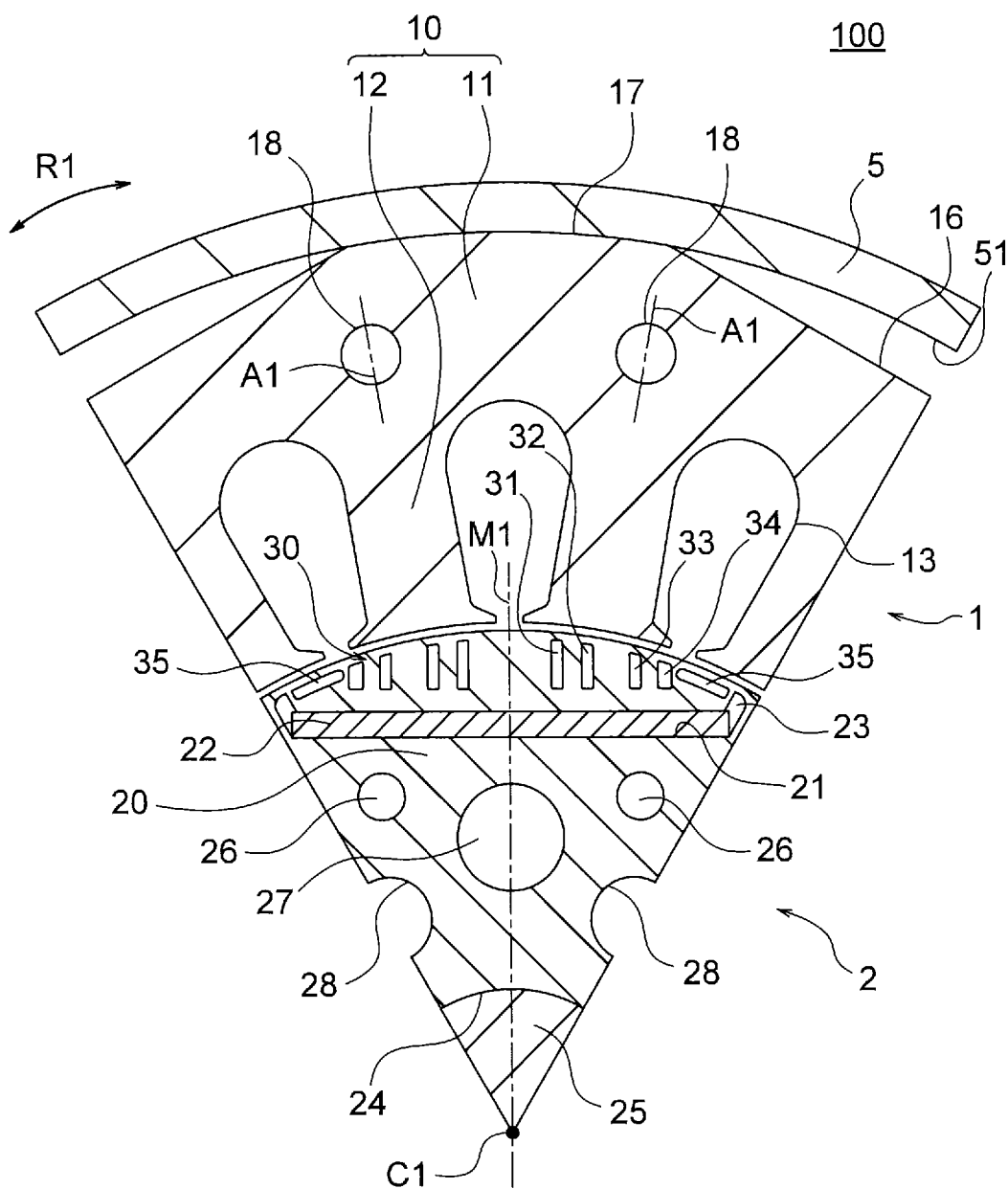
FIG. 2 is an enlarged cross-sectional view illustrating a part of the motor of the first embodiment.

FIG. 2 is an enlarged cross-sectional view illustrating a portion corresponding to one magnetic pole of the motor 100. A magnetic pole center line M1 is defined as a straight line in the radial direction that passes through a center of the magnet insertion hole 21 in the circumferential direction. The magnet insertion hole 21 extends linearly in a direction perpendicular to the magnetic pole center line M1. The permanent magnet 22 is in the form of a flat plate and has a plate surface perpendicular to the magnetic pole center line M1.

The permanent magnet 22 is formed of a rare earth magnet (more specifically, a rare earth sintered magnet) that contains neodymium (Nd), iron (Fe), and boron (B) as main components. The rare earth magnet has a high residual flux density and high coercive force, thereby making it possible to enhance the efficiency of the motor 100 and to enhance the demagnetization resistance. In order to further enhance the coercive force of the permanent magnet 22, dysprosium (Dy) or terbium (Tb) may be added.

The permanent magnet 22 is magnetized to have different magnetic poles on an outer side and an inner side in the radial direction of the rotor core 20. The permanent magnets 22 adjacent to each other in the circumferential direction have the magnetization directions opposite to each other.

Flux barriers 23 are formed on both sides of the magnet insertion hole 21 in the circumferential direction. The flux barrier 23 is a hole extending in the radial direction from an end of the magnet insertion hole 21 in the circumferential direction toward the outer circumference of the rotor core 20. The flux barrier 23 is provided to reduce leakage magnetic flux between adjacent magnetic poles (i.e., magnetic flux flowing through an interpolar portion).

In the rotor core 20, side slits 35 are formed on the inner sides of two flux barriers 23 in the circumferential direction. The side slit 35 is a slit elongated in the circumferential direction and extends along the outer circumference of the rotor core 20 as will be described later.

Figure 3:
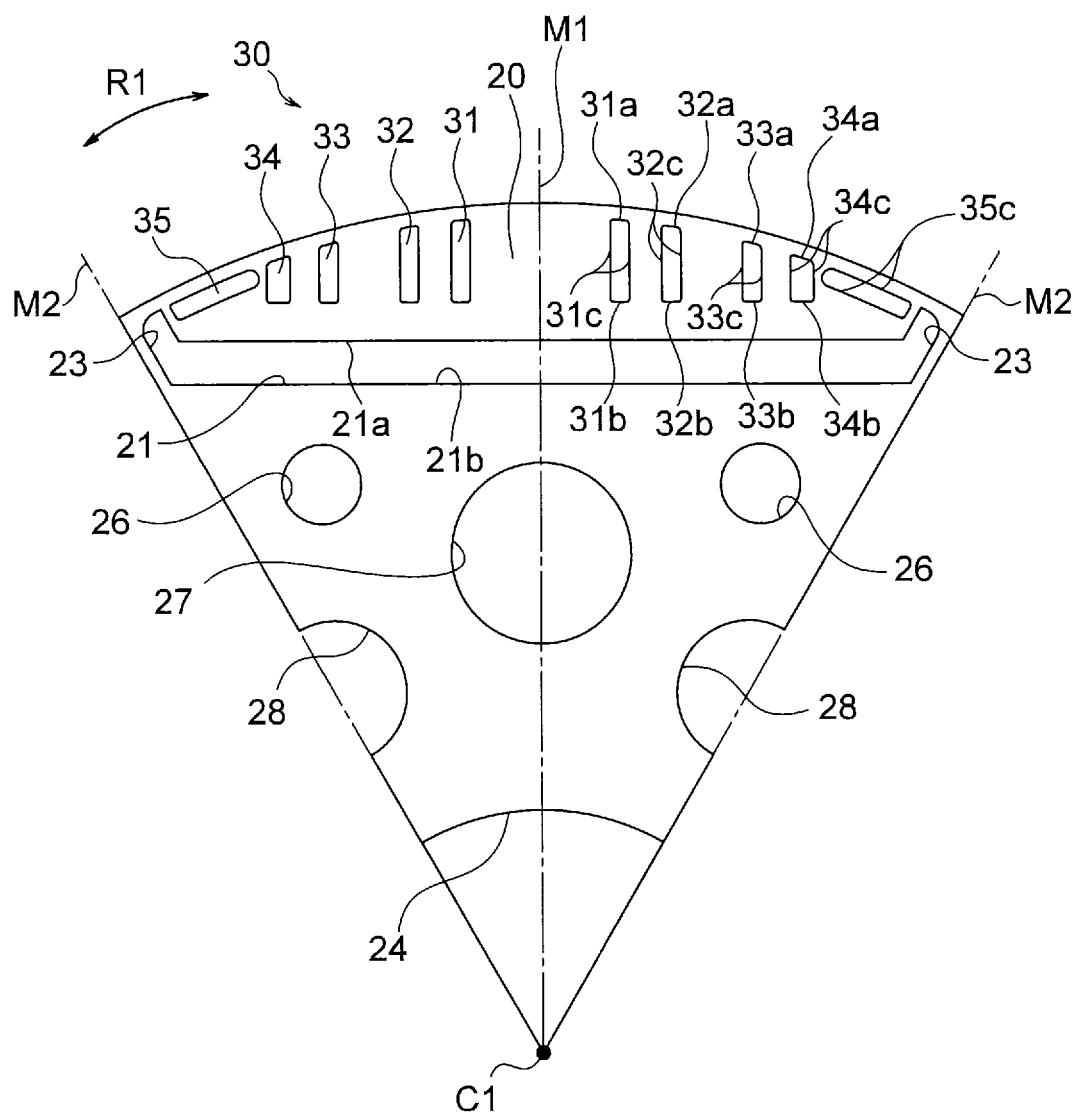
FIG. 3 is an enlarged cross-sectional view illustrating a part of a rotor core of the first embodiment.

FIG. 3 is an enlarged diagram illustrating a portion corresponding to one magnetic pole of the rotor core 20. In FIG. 3, a boundary between adjacent magnetic poles (i.e., interpolar portion) is denoted by reference character M2. The magnet insertion hole 21 has a first edge 21a which is an outer end in the radial direction, and a second edge 21b which is an inner end in the radial direction.

The rotor core 20 has slits 31, 32, 33, and 34 formed on an outer side of the magnet insertion hole 21 in the radial direction. The slits 31, 32, 33, and 34 are collectively referred to as a slit group 30.

Specifically, the slits 31, 32, 33, and 34 are formed in this order from the center of the magnet insertion hole 21 in the circumferential direction toward one end (the right end in the figure) of the magnet insertion hole 21 in the circumferential direction. Meanwhile, the slits 31, 32, 33, and 34 are formed in this order from the center of the magnet insertion hole 21 in the circumferential direction toward the other end (the left end in the figure) of the magnet insertion hole 21 in the circumferential direction. Two slits 31 are formed symmetrically with respect to the magnetic pole center line M1, two slits 32 are formed symmetrically with respect to the magnetic pole center line M1, two slits 33 are formed symmetrically with respect to the magnetic pole center line M1, and two slits 34 are formed symmetrically with respect to the magnetic pole center line M1. The expression that "the slits are formed symmetrically" means that the slits are symmetrical in shape and arrangement.

Each of the slits 31, 32, 33, and 34 has a shape elongated in the radial direction. The expression "shape elongated in the radial direction" means a shape having a length in the radial direction longer than its length in the circumferential direction. Each of the slits 31, 32, 33, and 34 has a rectangular shape elongated in the radial direction and having four curved corners.

Specifically, the slit 31 has an outer end portion 31a which is an end portion on the outer side in the radial direction, an inner end portion 31b which is an end portion on the inner side in the radial direction, and two side end portions 31c which are end portions on both sides in the circumferential direction. Similarly, the slit 32 has an outer end portion 32a, an inner end portion 32b, and two side end portions 32c. The slit 33 has an outer end portion 33a, an inner end portion 33b, and two side end portions 33c. The slit 34 has an outer end portion 34a, an inner end portion 34b, and two side end portions 34c.

The outer end portions 31a, 32a, 33a, and 34a of the slits 31, 32, 33 and 34 extend along the outer circumference of the rotor core 20. The inner end portions 31b, 32b, 33b, and 34b of the slits 31, 32, 33 and 34 extend along the first edge 21a of the magnet insertion hole 21. Longitudinal directions of the slits 31, 32, 33, and 34 are parallel to the magnetic pole center line M1.

The distance from each of the outer end portions 31a, 32a, 33a, and 34a of the slits 31, 32, 33, and 34 to the outer circumference of the rotor core 20 is desirably twice or more than a plate thickness of each of the stack elements (i.e., the electromagnetic steel sheets) constituting the stator core 10. The slits 31, 32, 33, and 34 are not limited to the shape described herein, and it is sufficient that each slit has a shape having a length in the radial direction longer than its length in the circumferential direction.

Figure 4:
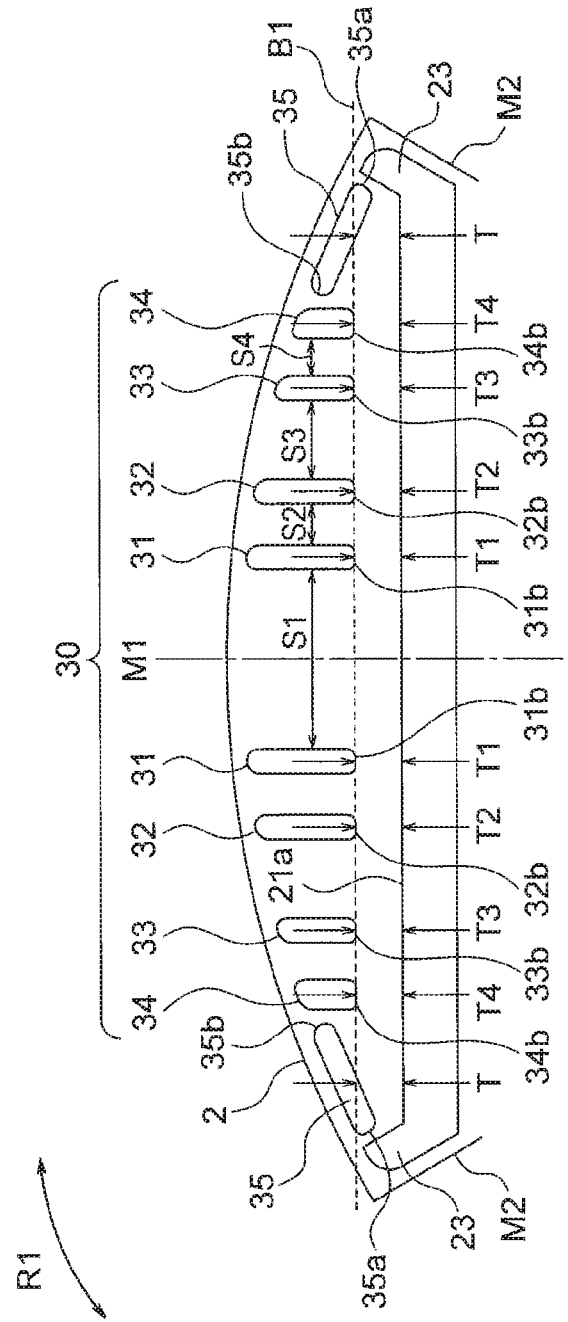
FIG. 4 is an enlarged diagram illustrating an outer circumferential portion of the rotor core of the first embodiment.

FIG. 4 is a diagram illustrating a positional relationship among the magnet insertion hole 21, the slits 31, 32, 33, and 34, and the side slits 35 in the rotor core 20. A distance (minimum distance) from the slit 31 to the magnet insertion hole 21, i.e., a distance (minimum distance) from the inner end portion 31b of the slit 31 to the first edge 21a of the magnet insertion hole 21 is expressed as T1.

Similarly, a distance from the slit 32 to the magnet insertion hole 21, i.e., a distance from the inner end portion 32b of the slit 32 to the first edge 21a of the magnet insertion hole 21 is expressed as T2. A distance from the slit 33 to the magnet insertion hole 21, i.e., a distance from the inner end portion 33b of the slit 33 to the first edge 21a of the magnet insertion hole 21 is expressed as T3. A distance from the slit 34 to the magnet insertion hole 21, i.e., a distance from the inner end portion 34b of the slit 34 to the first edge 21a of the magnet insertion hole 21 is expressed as 14.

The distances T1, T2, T3, and T4 from the slits 31, 32, 33, and 34 to the magnet insertion hole 21 are uniform. That is, T1=T2=T3=T4 is satisfied. The uniform distance from each of the slits 31, 32, 33, and 34 to the magnet insertion hole 21 is expressed as the distance T. Because the distances T1, T2, T3, and T4 are uniform, the inner end portions 31b, 32b, 33b, and 34b of the slits 31, 32, 33, and 34 are located on one straight line B1.

In FIG. 4, an interval in the circumferential direction between two slits 31 facing each across the magnetic pole center line M1 is expressed as S1. An interval between adjacent slits 31 and 32 in the circumferential direction is expressed as S2. An interval between adjacent slits 32 and 33 in the circumferential direction is expressed as S3. An interval between adjacent slits 33 and 34 in the circumferential direction is expressed as S4. In this embodiment, the slits 31, 32, 33, and 34 are arranged such that S1>S3>S2>S4 is satisfied. By widening the interval S1, a crimping portion 29 (FIG. 11) described later can be formed between the two slits 31.

Figure 5:
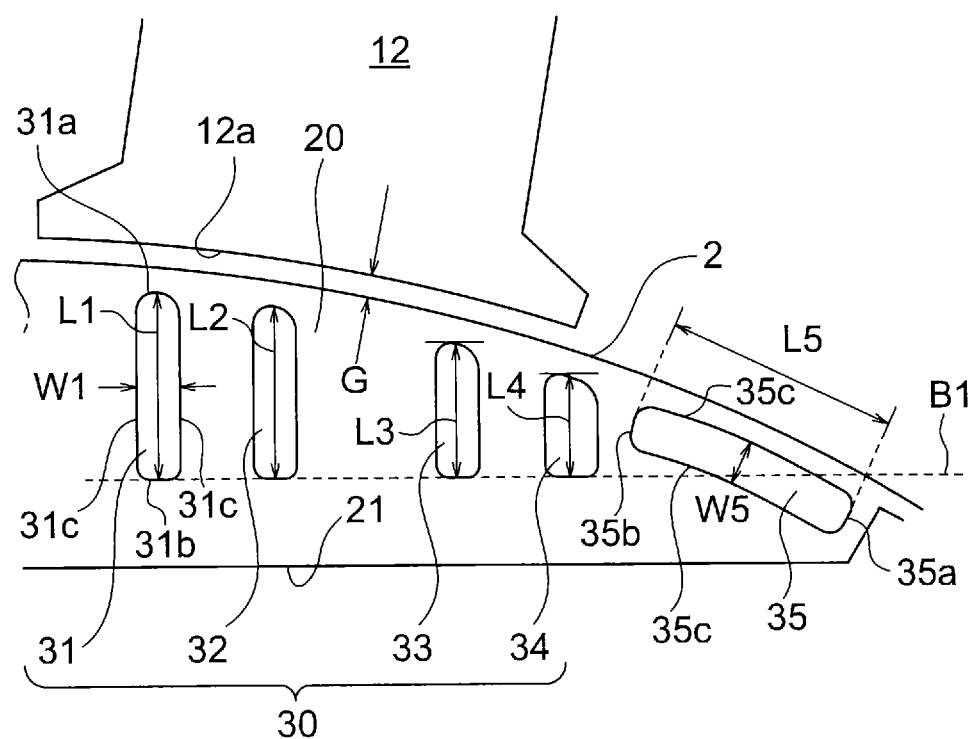
FIG. 5 is an enlarged schematic view illustrating a portion where a rotor and a stator of the first embodiment face each other.

FIG. 5 is an enlarged schematic view illustrating a portion where the rotor 2 and the stator 1 face each other. A length in the radial direction of the slit 31 (i.e., the maximum distance between the outer end portion 31a and the inner end portion 31b) is expressed as a length L1. Similarly, lengths of the slits 32, 33, and 34 in the radial direction are expressed as lengths L2, L3, and L4, respectively.

The lengths L1, L2, L3, and L4 of the slits 31, 32, 33, and 34 satisfy L1>L2>L3>L4. That is, among the slits 31, 32, 33, and 34, the slit closer to the magnetic pole center line M1 has a longer length, whereas the slit farther from the magnetic pole center line M1 has a shorter length.

The slit 31 has a shape having the length L1 in the radial direction longer than its length W1 in the circumferential direction. Similarly, each of the slits 32, 33, and 34 has a shape having a length in the radial direction longer than its length in the circumferential direction.

An air gap (i.e., gap) G is formed between the outer circumference of the rotor core 20 and an inner circumference 12a of the tooth 12 of the stator 1. The distance T from each of the above-described slits 31, 32, 33, and 34 to the magnet insertion hole 21 and the air gap G satisfy 2.75≤T/G≤5.25. The reason for this will be described later.

The above-described side slits 35 are formed on the inner sides of the flux barriers 23 in the circumferential direction. Each side slit 35 is desirably formed in a position that is as close as possible to the flux barrier 23 in the circumferential direction.

The side slit 35 has an end portion 35a on a side closer to the flux barrier 23, an end portion 35b on a side closer to the magnetic pole center line M1, and two end portions 35c on both sides in the radial direction. The side slit 35 has a shape having a length L5 in the circumferential direction (i.e., the maximum distance between the end portions 35a and 35b) longer than its length W5 in the radial direction (i.e., the maximum distance between the two end portions 35c).

That is, each of the slits 31, 32, 33, and 34 has a shape having a length in the radial direction longer than its length in the circumferential direction, whereas the side slit 35 has a shape having a length in the circumferential direction longer than a length in the radial direction.

By forming the side slits 35 on the inner sides of the flux barriers 23 in the circumferential direction, the magnetoresistance in the flux barrier 23 can be enhanced, and thus the flow of magnetic flux (i.e., leakage magnetic flux) from the permanent magnet 22 to the adjacent magnetic pole across the interpolar portion M2 can be reduced. Thus, the effective magnetic flux that interlinks with the winding 15 of the stator 1 can be increased, so that the efficiency of the motor can be enhanced.

The side slit 35 desirably protrudes to the magnet insertion hole 21 side (i.e., the inner side in the radial direction)

with respect to the straight line B1 passing through the inner end portions 31b, 32b, 33b, and 34b of the slits 31, 32, 33, and 34. In other words, the distance from the side slit 35 to the magnet insertion hole 21 is desirably shorter than the distance T described above. Thus, an interval between the side slit 35 and the flux barrier 23 is narrowed, and the effect of reducing the leakage magnetic flux can be enhanced.

Function

Next, a function to reduce the eddy current loss exhibited by the motor 100 of the first embodiment will be described. The permanent magnet 22 is formed of a rare earth magnet and thus has conductivity. While magnetic flux (i.e., stator magnetic flux) generated at the winding 15 of the stator 1 passes through the permanent magnet 22, an eddy current flows inside the permanent magnet 22 due to a change with time (dΦ/dt) of the stator magnetic flux Φ passing through the permanent magnet 22. The eddy current leads to a loss (i.e., eddy current loss), and causes the reduction in the efficiency of the motor. Further, the temperature of the permanent magnet 22 increases due to Joule heating, which causes high-temperature demagnetization of the permanent magnet 22.

In the first embodiment, the slits 31, 32, 33, and 34 of the rotor core 20 achieve the reduction in the eddy current loss. First, for comparison with the motor 100 of the first embodiment, a motor 100H of a comparison example will be described.

Figure 6:
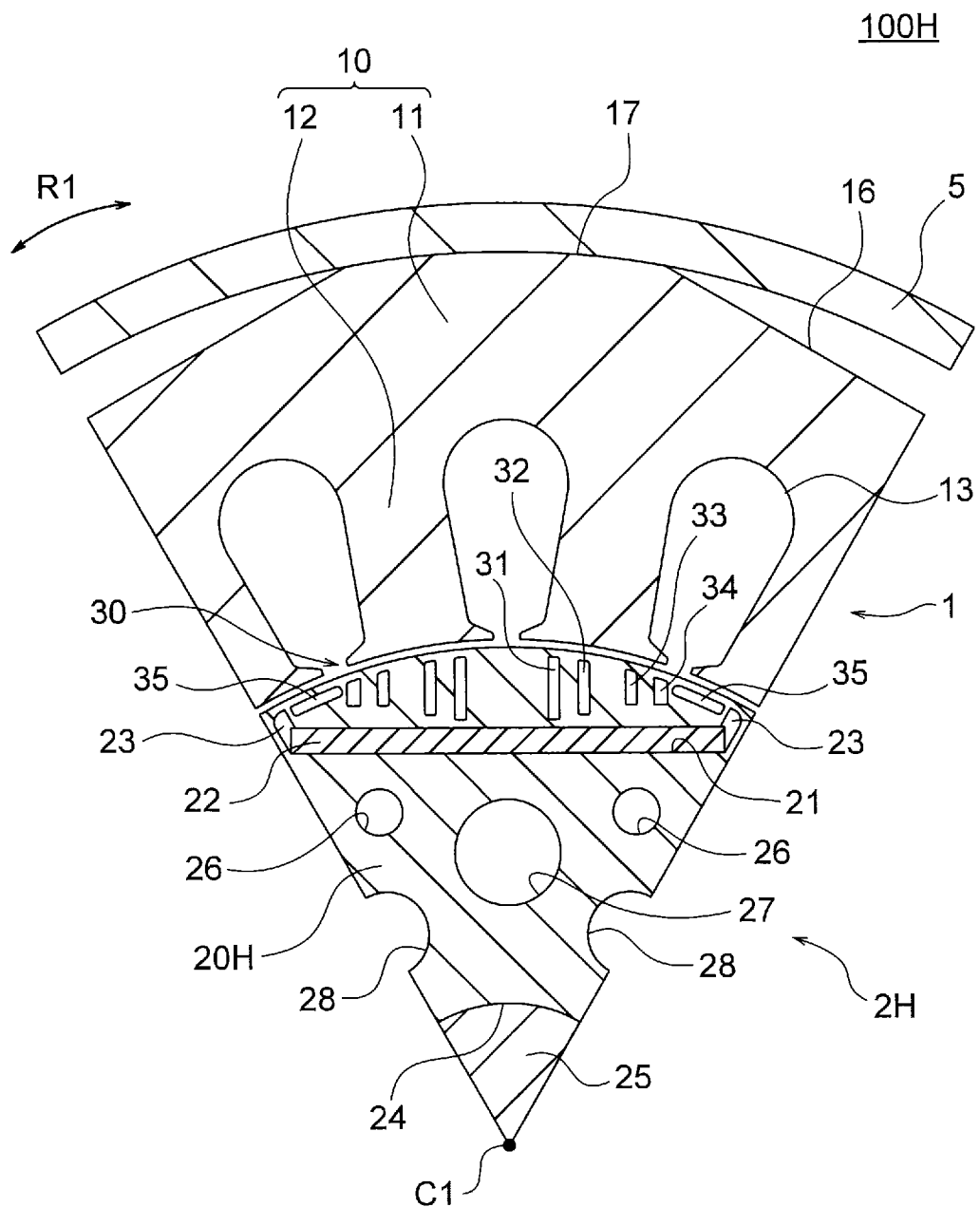
FIG. 6 is an enlarged cross-sectional view illustrating a part of a motor of a comparison example.

FIG. 6 is a cross-sectional view illustrating a portion corresponding to one magnetic pole of the motor 100H of the comparison example. The motor 100H of the comparison example includes the stator 1 and a rotor 2H. A rotor core 20H of the rotor 2H has a different configuration from the rotor core 20 of the first embodiment.

Figure 7:
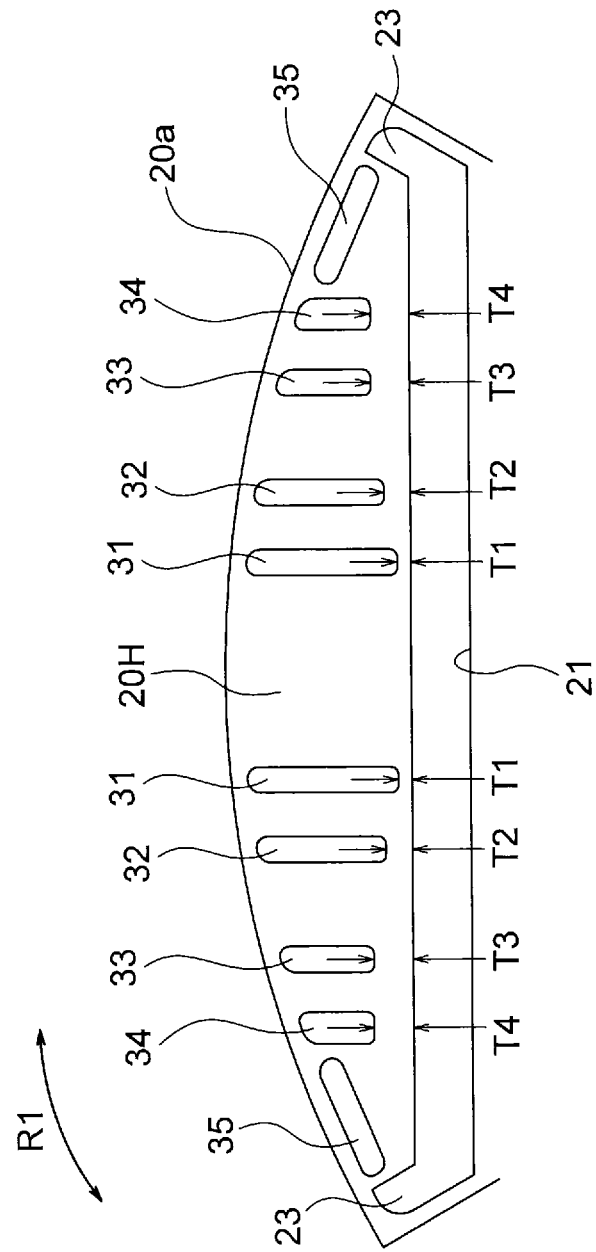
FIG. 7 is an enlarged cross-sectional view illustrating an outer circumferential portion of a rotor core of the comparison example.

FIG. 7 is a diagram illustrating a portion corresponding to one magnetic pole of the rotor core 20H of the comparison example. In the rotor core 20H of the comparison example, the distances from the slits 31, 32, 33, and 34 to the magnet insertion hole 21 are not uniform. The distances T1, T2, T3, and T4 from the slits 31, 32, 33, and 34 to the magnet insertion hole 21 satisfy T1<T2<T3=T4.

That is, the distance T1 from the slit 31 closest to the center of the magnetic pole to the magnet insertion hole 21 is the shortest, and the distance T2 from the slit 32 to the magnet insertion hole 21 is the second shortest. The distances T3 and T4 from the slits 33 and 34 to the magnet insertion hole 21 are equal to each other and longer than the distances T1 and T2.

Figure 8:
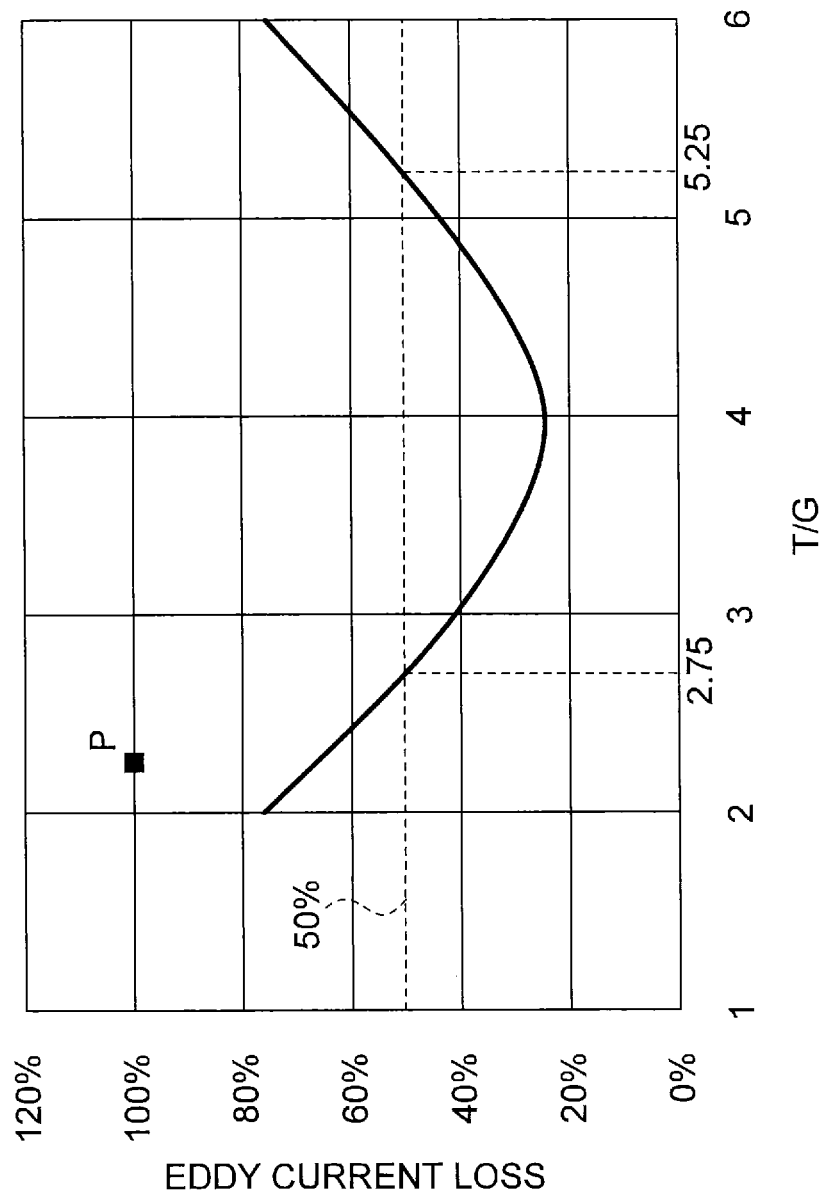
FIG. 8 is a graph illustrating the relationship between T/G and eddy current loss.

FIG. 8 is a graph illustrating a result of three-dimensional electromagnetic field analysis on the relationship between the eddy current loss and the distance T from each of the slits 31, 32, 33, and 34 to the magnet insertion hole 21. In FIG. 8, the horizontal axis shows a value T/G obtained by dividing the distance T from each of the slits 31, 32, 33, and 34 to the magnet insertion hole 21 by the air gap G. The vertical axis thereof shows the eddy current loss (relative value). The analysis results of the motor 100 of the first embodiment are indicated by a solid line.

FIG. 8 also shows data (reference character P) of the motor 100H of the comparison example. In the comparison example, T1/G is set to 1, T2/G is set to 2, T3/G is set to 3, and T4/G is set to 3. Thus, a value (i.e., T/G) obtained by dividing an average of the distances T1, T2, T3, and T4 by the air gap G is 2.25. In FIG. 8, the vertical axis indicates a relative value with respect to the eddy current loss (in unit of W) in the comparison example (T/G=2.25).

From the result shown in FIG. 8, it is understood that in a range of $2.75 \leq T/G \leq 5.25$, the eddy current loss in the motor 100 of the first embodiment is reduced to 50% or less of the eddy current loss in the comparison example. It is understood that for T/G=4, the eddy current loss is minimum and is reduced to 25% of the eddy current loss in the comparison example.

The reason why the eddy current loss is reduced in this way is considered as follows. In the motor 100H of the comparison example, the distances from the slits 31, 32, 33, and 34 to the magnet insertion hole 21 are not uniform, and the magnetic path between the slit 31 and the magnet insertion hole 21 is the narrowest. Thus, when the stator magnetic flux flows through this part, magnetic saturation occurs. When the magnetic saturation occurs in a part of the rotor core 20H facing the permanent magnet 22, the eddy current is more likely to flow in the permanent magnet 22.

In contrast, in the motor 100 of the first embodiment (FIG. 4), the slits 31, 32, 33, and 34 have the uniform distance T to the magnet insertion hole 21, and the distance T is in a range of $2.75 \leq T/G \leq 5.25$. Thus, there is no portion between each of the slits 31, 32, 33, and 34 and the magnet insertion hole 21 where the magnetic path is locally narrowed, and thus the occurrence of the magnetic saturation is suppressed. Since the occurrence of the magnetic saturation is suppressed in this way, the eddy current loss can be reduced.

Generally, in order to reduce the eddy current loss, a configuration in which the permanent magnet 22 is divided into a plurality of parts insulated from each other by an insulating film is employed. However, this configuration increases the number of parts due to the division of the permanent magnet 22. Further, as the size of the permanent magnet 22 is reduced, the processing cost of the permanent magnet 22 increases. For these reasons, dividing the permanent magnet 22 leads to an increase in the manufacturing cost.

In contrast, in the motor 100 of the first embodiment, the slits 31, 32, 33, and 34 have the uniform distance T to the magnet insertion hole 21, and T/G is set within a range of $2.75 \leq T/G \leq 5.25$. Thus, the effect of reducing the eddy current loss can be obtained without dividing the permanent magnet 22 to the same extent as the case in which the permanent magnet 22 is divided.

As described above, since the magnetic path having a width corresponding to the distance T is formed between each of the slits 31, 32, 33, and 34 and the magnet insertion hole 21, the stator magnetic flux directed to the permanent magnet 22 can be released to the magnetic path. Thus, the stator magnetic flux is less likely to be concentrated on the permanent magnet 22, and thus the demagnetization of the permanent magnet 22 can be suppressed. That is, the demagnetization resistance can be enhanced.

Refrigerant Flow Passage

Next, a refrigerant flow passage of the motor 100 will be described. The motor 100 is used, for example, in the compressor 500 (FIG. 15) of an air conditioner. In the air conditioner, refrigerant compressed by and discharged from the compressor 500 circulates through a refrigerant circuit and returns to the compressor 500. Since the motor 100 is fitted inside the compressor 500, it is necessary to provide a flow passage for the refrigerant (refrigerant flow passage) in the motor 100.

Thus, as shown in FIG. 2, the cutout portions 16 are formed on the outer circumference of the stator 1. During operation of the compressor 500, the refrigerant flows in the axial direction between the cutout portion 16 and the inner circumferential surface 51 of the shell 5. That is, the refrigerant flow passage is formed by the cutout portion 16 and the inner circumferential surface 51 of the shell 5. The cutout portion 16 is desirably a flat surface, but may be, for example, a V-shaped groove.

The cutout portions 16 are desirably formed evenly in the circumferential direction of the stator 1. This is because such an arrangement of the cutout portions 16 can make the flow of refrigerant uniform. In the stator 1, six cutout portions 16 are formed. However, the number of cutout portions 16 is not limited to six and may be five or less, or seven or more.

Through-holes 18 are formed in the yoke 11 of the stator core 10. The through-holes 18 pass through the stator core 10 in the axial direction. During operation of the compressor 500, the refrigerant flows through the through-holes 18 in the axial direction. That is, the through-holes 18 form the refrigerant flow passages.

In an example illustrated in FIG. 1(A), the through-holes 18 are formed in 12 positions on the inner sides in the radial direction of the abutting surfaces 17 of the stator core 10. Thus, for example, crimping portions can be formed on the inner sides in the radial direction of the cutout portions 16 of the stator core 10. The number and arrangement of the through-holes 18 are not limited to such an example.

The through-hole 18 is desirably formed on a straight line A1 in the radial direction that passes through the center of the tooth 12 in the circumferential direction. That is, the through-hole 18 is desirably formed at equal distances from the slots 13 adjacent in the circumferential direction. This is to make the through-hole 18 interrupt the flow of magnetic flux through the tooth 12 and the yoke 11 as least as possible.

The stator 1 has the cutout portions 16 and the through-holes 18 as the refrigerant flow passages, so that a sufficient flow rate of the refrigerant through the compressor 500 can be obtained. The refrigerant passes through the motor 100, and heat of the motor 100 is dissipated by the refrigerant. Thus, an increase in the temperature of the motor 100 is reduced, and thus the demagnetization of the permanent magnet 22 at high temperature can be suppressed.

In this example, the stator 1 includes the cutout portions 16 and the through-holes 18 as the refrigerant flow passages, but the stator 1 may be configured to include either the cutout portions 16 alone or the through-holes 18 alone.

Figure 9:
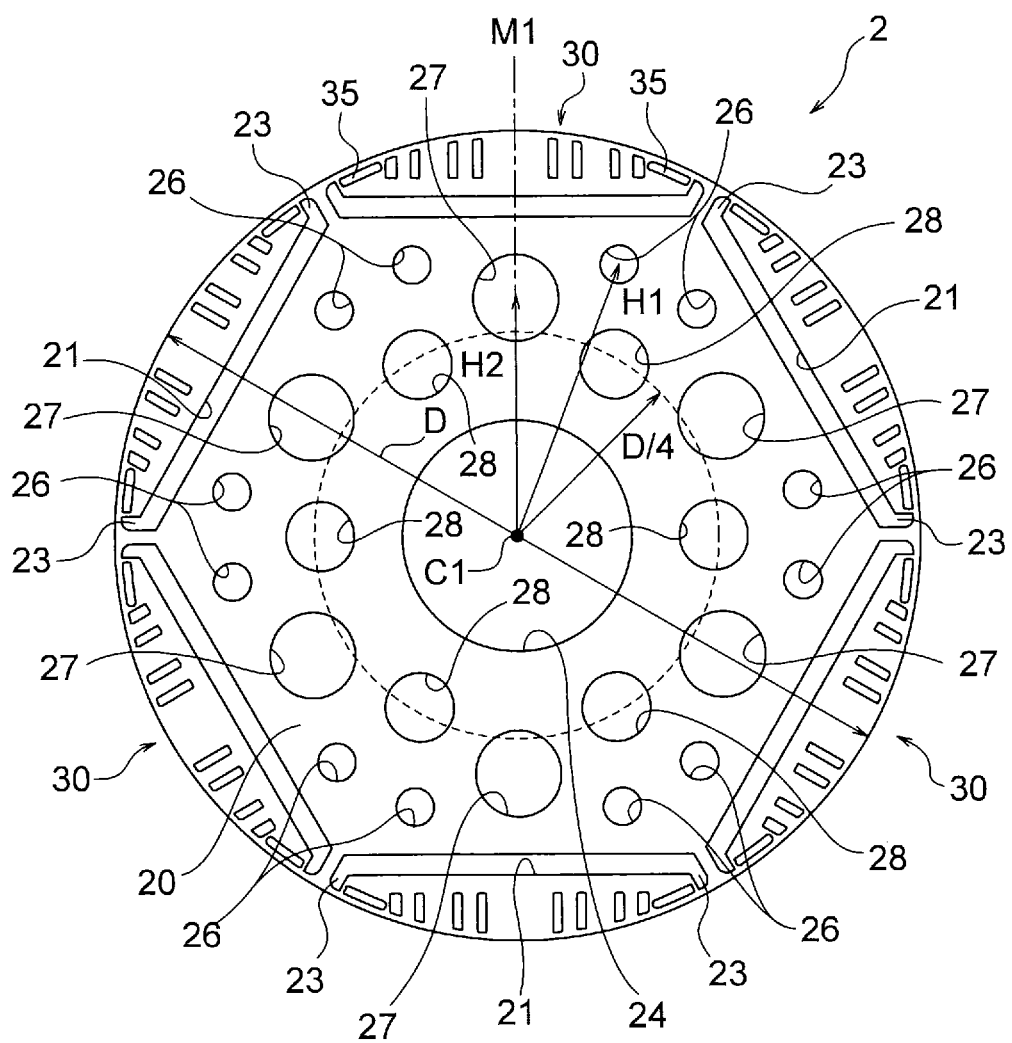
FIG. 9 is a diagram for explaining the arrangement of through-holes in the rotor core of the first embodiment.
Figure 10:
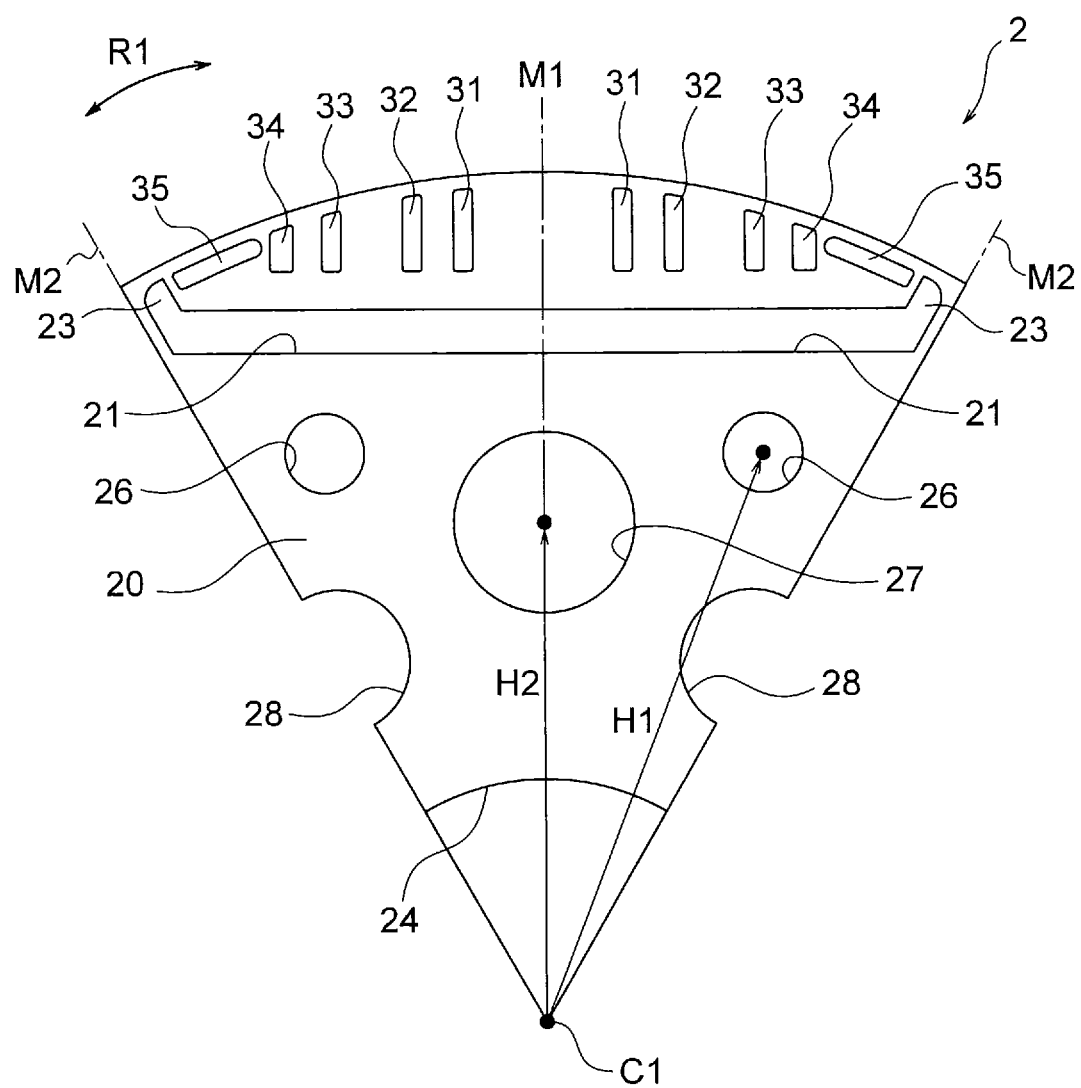
FIG. 10 is an enlarged diagram illustrating a part of FIG. 9.

FIG. 9 is a diagram illustrating the rotor core 20 of the rotor 2. FIG. 10 is a diagram illustrating a portion corresponding to one magnetic pole of the rotor core 20. The rotor 2 has first through-holes 26, second through-holes 27, and third through-holes 28 as the refrigerant flow passages in this order from the outer side of the rotor core 20 in the radial direction. In FIG. 1(A) described above, these through-holes 26, 27, and 28 are omitted.

Two first through-holes 26 are provided for each magnetic pole and formed on both sides of the magnetic pole center line M1 in the circumferential direction. One second through-hole 27 is provided for each magnetic pole and formed on the magnetic pole center line M1. One third through-hole 28 is provided for each magnetic pole and formed to straddle the interpolar portion M2. Among the through-holes 26, 27, and 28, the inner diameter of the first through-hole 26 is the smallest, while the inner diameter of the second through-hole 27 is the largest. Each of the through-holes 26, 27, and 28 has a circular shape, but is not limited thereto.

In this way, the rotor 2 includes the through-holes 26, 27, and 28 as the refrigerant flow passages, and thus the rotor 2 can be efficiently cooled by the refrigerant flowing through the through-holes 26, 27, and 28. Thus, an increase in the temperature of the permanent magnet 22 is reduced, the demagnetization of the permanent magnet 22 at high temperature can be suppressed.

In FIG. 9, an outer diameter of the rotor core 20 is expressed as D. At least one of the through-holes 26, 27, and 28 of the rotor core 20 is formed such that a distance H from the axis C1 to a center of the through-hole satisfies H≥D/4. In other words, at least one of the through-holes 26, 27, and 28 of the rotor core 20 is formed on the outer side in the radial direction of a position half the radius of the rotor core 20 from the axis C1. In this example, a distance H1 from the axis C1 to a center of the through-hole 26 satisfies H1≥D/4, while a distance H2 from the axis C1 to a center of the through-hole 27 satisfies H2≥D/4.

Since at least one of the through-holes 26, 27, and 28 (in this example, the first through-hole 26 and the second through-hole 27) satisfies H≥D/4, the refrigerant flow passage can be positioned close to the permanent magnet 22. As a result, the permanent magnet 22 is efficiently cooled, and thus the effect of suppressing the demagnetization of the permanent magnet 22 at high temperature can be enhanced.

Crimping Portion

Figure 11:
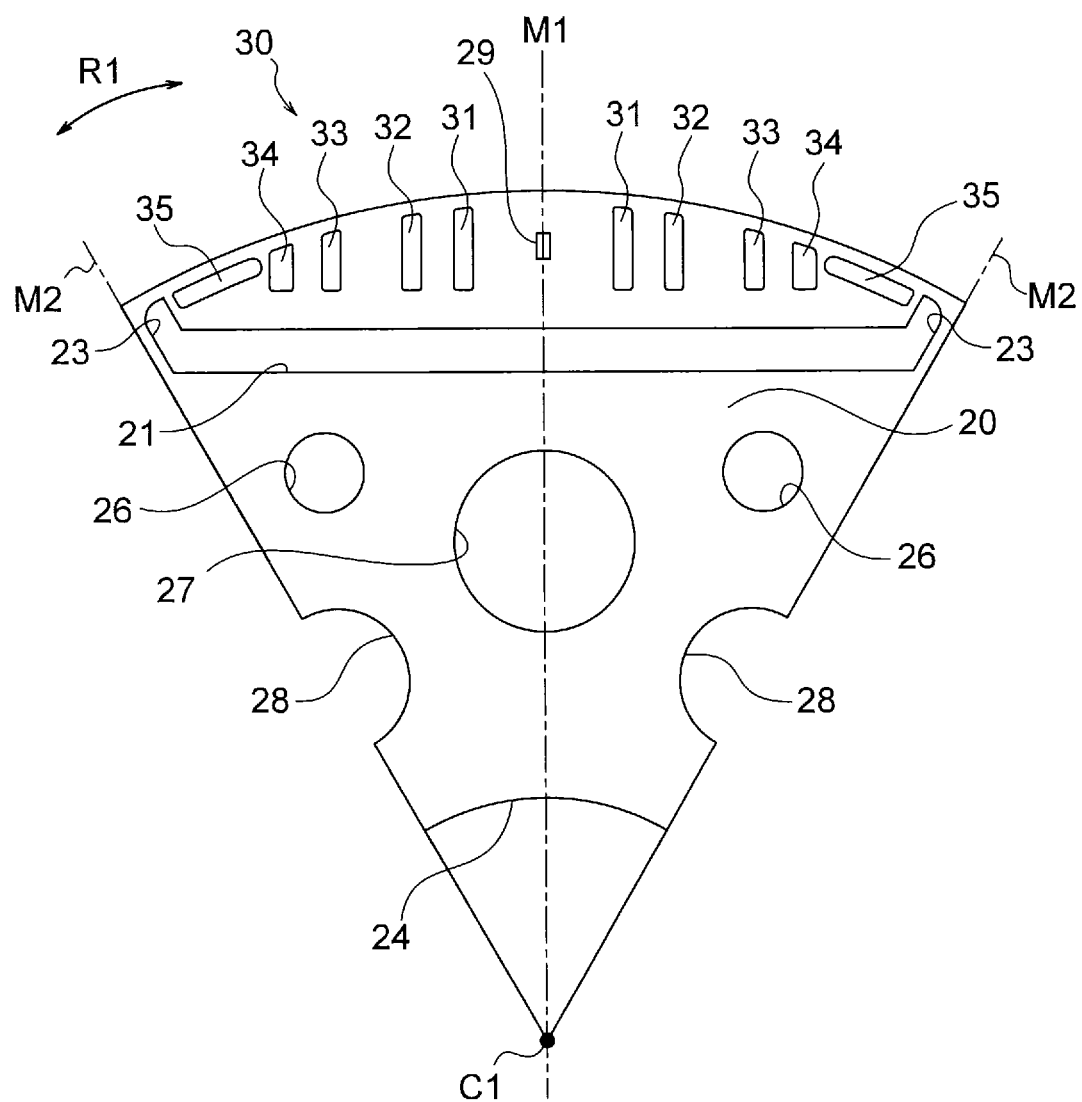
FIG. 11 is a diagram for explaining the arrangement of a crimping portion in the rotor core of the first embodiment.

Next, the crimping portion 29 of the rotor core 20 will be described. FIG. 11 is a diagram for explaining the arrangement of the crimping portion 29 in the rotor core 20. As described above, the rotor core 20 is formed of a plurality of stack elements which are stacked in the axial direction and integrated by the crimping portions 29.

The crimping portion 29 is provided on the outer side of the magnet insertion hole 21 of the rotor core 20 in the radial direction and on the magnetic pole center line M1 (i.e., at the center of the magnet insert hole 21 in the circumferential direction). As described above, a wide space is provided between the two slits 31 of the rotor core 20, and thus the crimping portion 29 can be formed between the two slits 31. Further, the crimping portion 29 and the slit 31 are spaced apart from each other, making it possible to avoid the concentration of magnetic flux.

Effects of Embodiments

As described above, the motor 100 of the first embodiment of the present invention has a plurality of slits 31, 32, 33, and 34 disposed on the outer side of the magnet insertion hole 21 of the rotor core 20 in the radial direction. The slits 31, 32, 33, and 34 are elongated in the radial direction. These plurality of slits 31, 32, 33, and 34 have the uniform distance T to the magnet insertion hole 21, and the distance T and the air gap G between the stator 1 and the rotor 2 satisfy 2.75≤T/G≤5.25. With this configuration, the eddy current flowing through the permanent magnets 22 can be reduced. That is, the eddy current loss can be reduced, and the efficiency of the motor can be enhanced. Since there is no need to divide the permanent magnet 22, an increase in the manufacturing cost can be avoided.

Further, the stator magnetic flux directed toward the permanent magnet 22 can be released to the magnetic path between each of the slits 31, 32, 33, and 34 and the magnet insertion hole 21. Thus, the concentration of the stator magnetic flux on the permanent magnet 22 can be suppressed, and the demagnetization of the permanent magnet 22 can be suppressed.

Each of the plurality of slits 31, 32, 33, and 34 extends parallel to the magnetic pole center line M1, and thus the magnetic flux emanated from the permanent magnet 22 can be guided to the stator 1 by the shortest distance.

Since the plurality of slits 31, 32, 33, and 34 are formed symmetrically with respect to the magnetic pole center line M1, the spatial harmonic of the magnetic flux generated in the air gap is suppressed, and torque ripple (torque pulsation) and exciting force in the radial direction are also suppressed. Thus, noise and vibration can be suppressed.

The interval between two slits 31 formed closest to the center of the magnet insertion hole 21 in the circumferential direction among the plurality of slits 31, 32, 33, and 34 is wider than the interval between the other two adjacent slits. Thus, the crimping portion 29 can be formed between the two slits 31.

The rotor core 20 includes the side slits 35 on both ends of the magnet insertion hole 21 in the circumferential direction, and thus the leakage magnetic flux between the adjacent magnetic poles can be reduced.

Since the magnet insertion hole 21 extends linearly in the direction perpendicular to the magnetic pole center line M1, a core portion located on the outer side of the magnet insertion hole 21 in the radial direction can be reduced. Thus, when the rotor 2 rotates, the centrifugal force applied to the core portion on the outer side of the magnet insertion hole 21 in the radial direction is reduced, and thus the durability of the rotor core 20 can be enhanced.

The rotor core 20 includes the through-holes 26, 27, and 28 passing through the rotor core 20 in the axial direction, and thus the rotor 2 can be cooled by the refrigerant flowing through the through-holes 26, 27, and 28. Thus, the demagnetization of the permanent magnet 22 at high temperature can be suppressed.

The diameter D of the rotor core 20 and the distance H from the axis C1 to the center of each of the through-holes 27 and 28 satisfy D/4≤H, and thus the permanent magnet 22 can be efficiently cooled by the refrigerant flowing through the through-holes 27 and 28. As a result, the effect of suppressing the demagnetization of the permanent magnet 22 at high temperature can be enhanced.

The winding 15 of the stator 1 has the conductor 15a made of copper or aluminum and the insulating film 15b covering the surface of the conductor 15a, and thus corrosion of the winding 15 can be prevented in, for example, the refrigerant of the compressor 500.

Further, since the stator core 10 has the through-holes 18 passing through the stator core 10 in the axial direction and has the cutout portions 16 on the outer circumference of the stator core 10, the motor 100 can be cooled, for example, by the refrigerant flowing through the through-holes 18.

Second Embodiment

Figure 12:
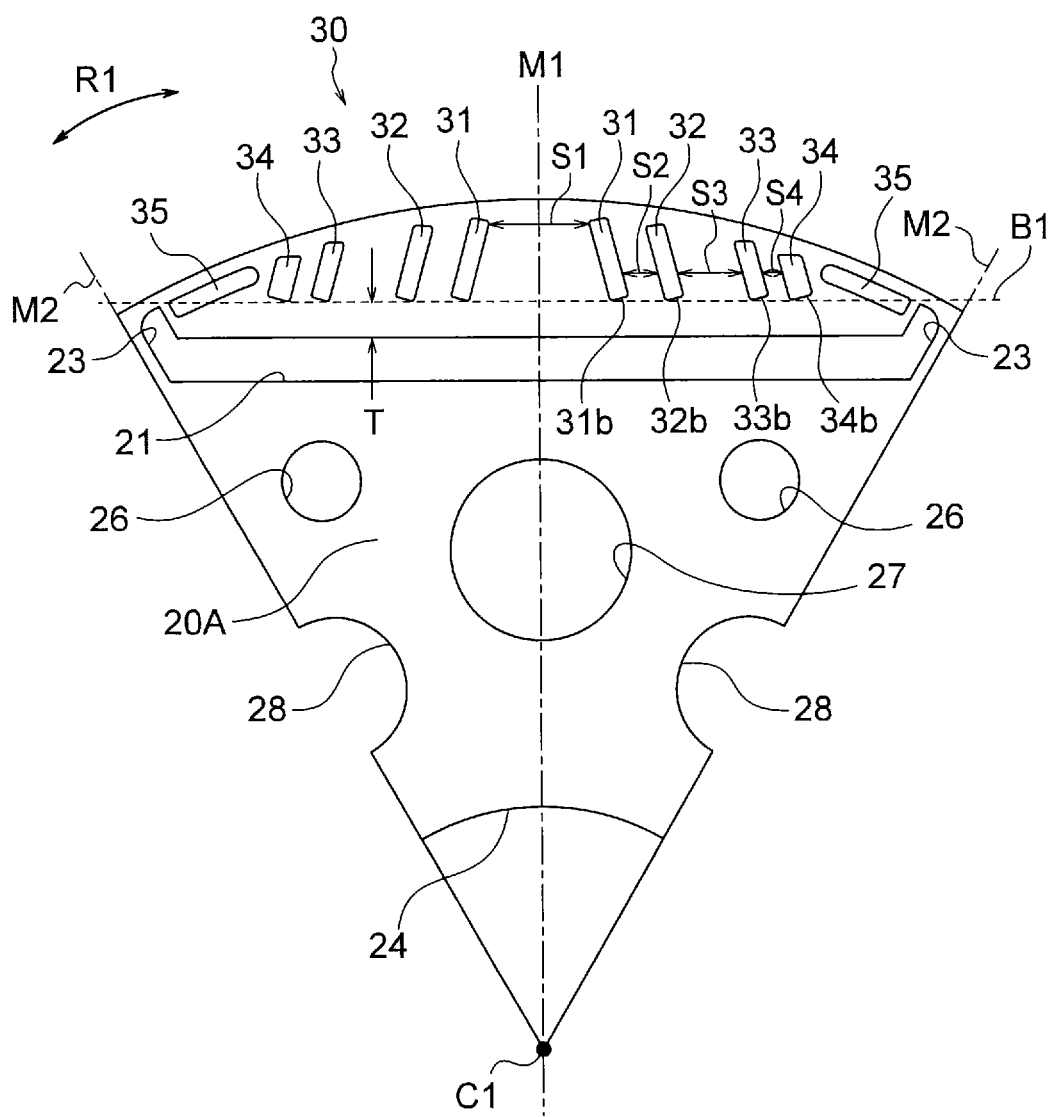
FIG. 12 is an enlarged diagram illustrating a part of a rotor core of a second embodiment.

Next, a second embodiment of the present invention will be described. FIG. 12 is a diagram illustrating a portion corresponding to one magnetic pole of a rotor core 20A in a motor of the second embodiment. The motor of the second embodiment differs from that of the first embodiment in extending directions of the slits 31, 32, 33, and 34 of the rotor core 20A.

Each of the above-described slits 31, 32, 33, and 34 of the first embodiment extends parallel to the magnetic pole center line M1 (see FIG. 3). In contrast, the slits 31, 32, 33, and 34 of the second embodiment extend to be inclined with respect to the magnetic pole center line M1. Each of the slits 31, 32, 33, and 34 is inclined in a direction so that a direction to the magnetic pole center line M1 decreases outward in the radial direction.

The slits 31, 32, 33, and 34 located on one side (the right side in FIG. 12) of the magnetic pole center line M1 and the slits 31, 32, 33, and 34 located on the other side (the left side in FIG. 12) of the magnetic pole center line M1 are inclined symmetrically to each other.

The slits 31, 32, 33, and 34 located on the same side of the magnetic pole center line M1 desirably extend parallel to each other. With this configuration, the interval between the slits is not narrowed locally, and magnetic saturation is less likely to occur between the slits.

In the second embodiment, each of the slits 31, 32, 33, and 34 is elongated in the radial direction (in other words, has a length in the radial direction longer than its length in the circumferential direction). The slits 31, 32, 33, and 34 have the uniform distance T (i.e., minimum distance) to the magnet insertion hole 21, and this distance T satisfies 2.75≤T/G≤5.25.

An interval S1 between two slits 31 adjacent to each other across the magnetic pole center line M1 in the circumferential direction, an interval S2 between adjacent slits 31 and 32 in the circumferential direction, an interval S3 between adjacent slits 32 and 33 in the circumferential direction, and an interval S4 between adjacent slits 33 and 34 in the circumferential direction satisfy S1>S3>S2>S4. The crimping portion 29 (FIG. 11) may be formed between the two slits 31.

The motor of the second embodiment is configured in a similar manner to the motor of the first embodiment except that the slits 31, 32, 33, and 34 of the rotor core 20A are inclined with respect to the magnetic pole center line M1.

In the second embodiment, while the slits 31, 32, 33, and 34 of the rotor core 20A are inclined with respect to the magnet pole center line M1, the slits 31, 32, 33, and 34 have the uniform distance T to the magnet insertion hole 21, and this distance T satisfies 2.75≤T/G≤5.25. Thus, the eddy current loss can be reduced as in the first embodiment.

Third Embodiment

Figure 13:
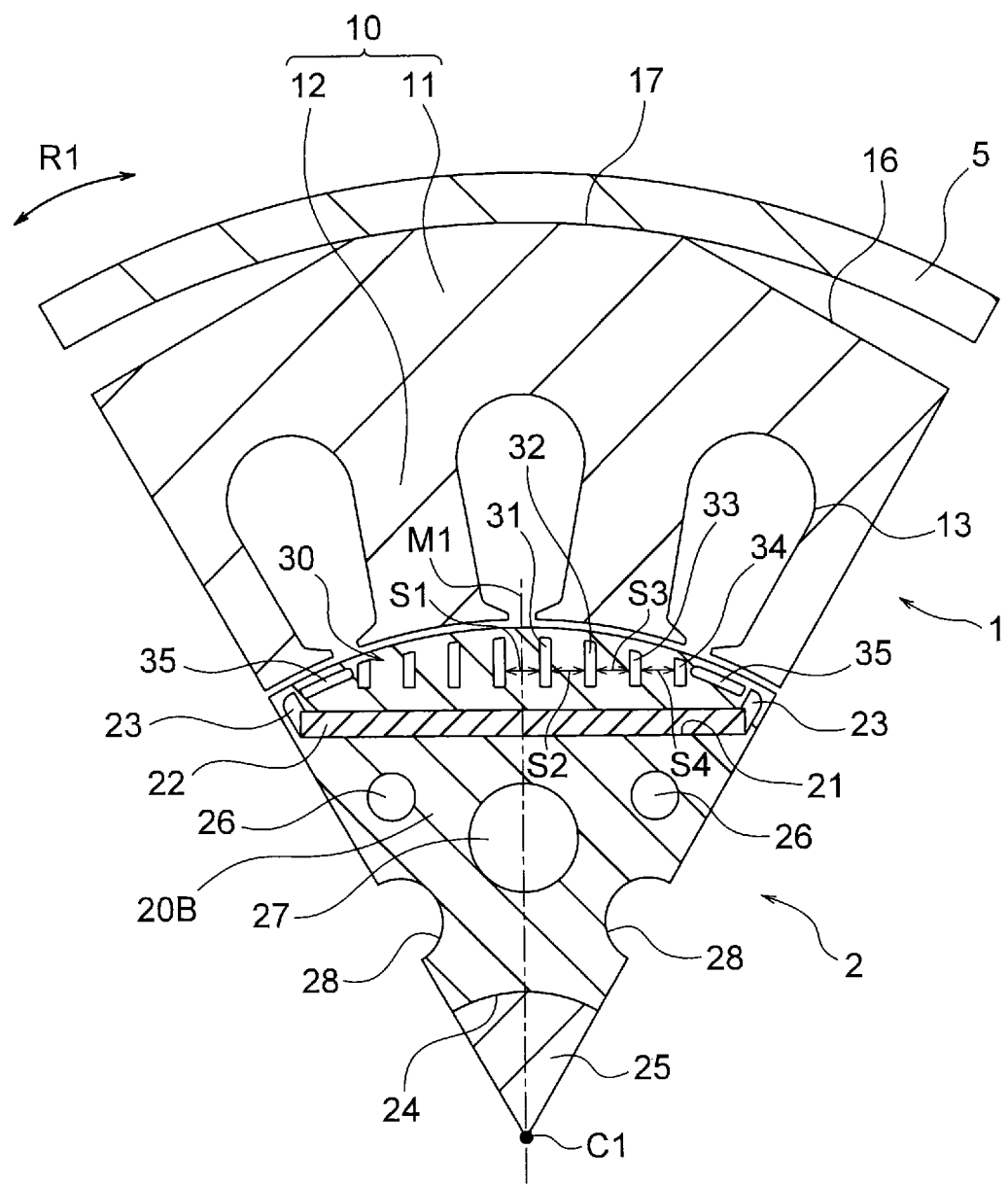
FIG. 13 is an enlarged cross-sectional view illustrating a part of a motor of a third embodiment.

Next, a third embodiment of the present invention will be described. FIG. 13 is a cross-sectional view illustrating a portion corresponding to one magnetic pole of a motor of the third embodiment. The motor of the third embodiment differs from that of the first embodiment in the arrangement of the slits 31, 32, 33, and 34 in a rotor core 20B.

The above-described slits 31, 32, 33, and 34 of the first embodiment are arranged at unequal intervals in the circumferential direction. In contrast, the slits 31, 32, 33, and 34 of the third embodiment are arranged at equal intervals in the circumferential direction.

In FIG. 13, an interval S1 between two slits 31 adjacent to each other across the magnetic pole center line M1 in the circumferential direction, an interval S2 between adjacent slits 31 and 32 in the circumferential direction, an interval S3 between adjacent slits 32 and 33 in the circumferential direction, and an interval S4 between adjacent slits 33 and 34 in the circumferential direction satisfy S1=S2=S3=S4.

The slits 31, 32, 33, and 34 extend parallel to the magnetic pole center line M1 as in the first embodiment. However, as described in the second embodiment, the slits 31, 32, 33, and 34 may extend to be inclined with respect to the magnetic pole center line M1. In such a case, the slits 31, 32, 33, and 34 located on one side of the magnetic pole center line M1 and the slits 31, 32, 33, and 34 located on the other side of the magnetic pole center line M1 are desirably inclined symmetrically with respect to the magnetic pole center line M1.

As in the first embodiment, the slits 31, 32, 33, and 34 have the uniform distance (denoted by T) to the magnet insertion hole 21, and this distance T satisfies 2.75≤T/G≤5.25.

The motor of the third embodiment is configured in a similar manner to the motor of the first embodiment except that the slits 31, 32, 33, and 34 of the rotor core 20B are arranged at equal intervals.

In the third embodiment, the slits 31, 32, 33, and 34 of the rotor core 20B are arranged at equal intervals in the circumferential direction. Thus, in addition to the effects described in the first embodiment, the stator magnetic flux flowing into the rotor core 20B can be evenly dispersed, and magnetic saturation between the slits of the rotor core 20B can be suppressed.

Fourth Embodiment

Figure 14:
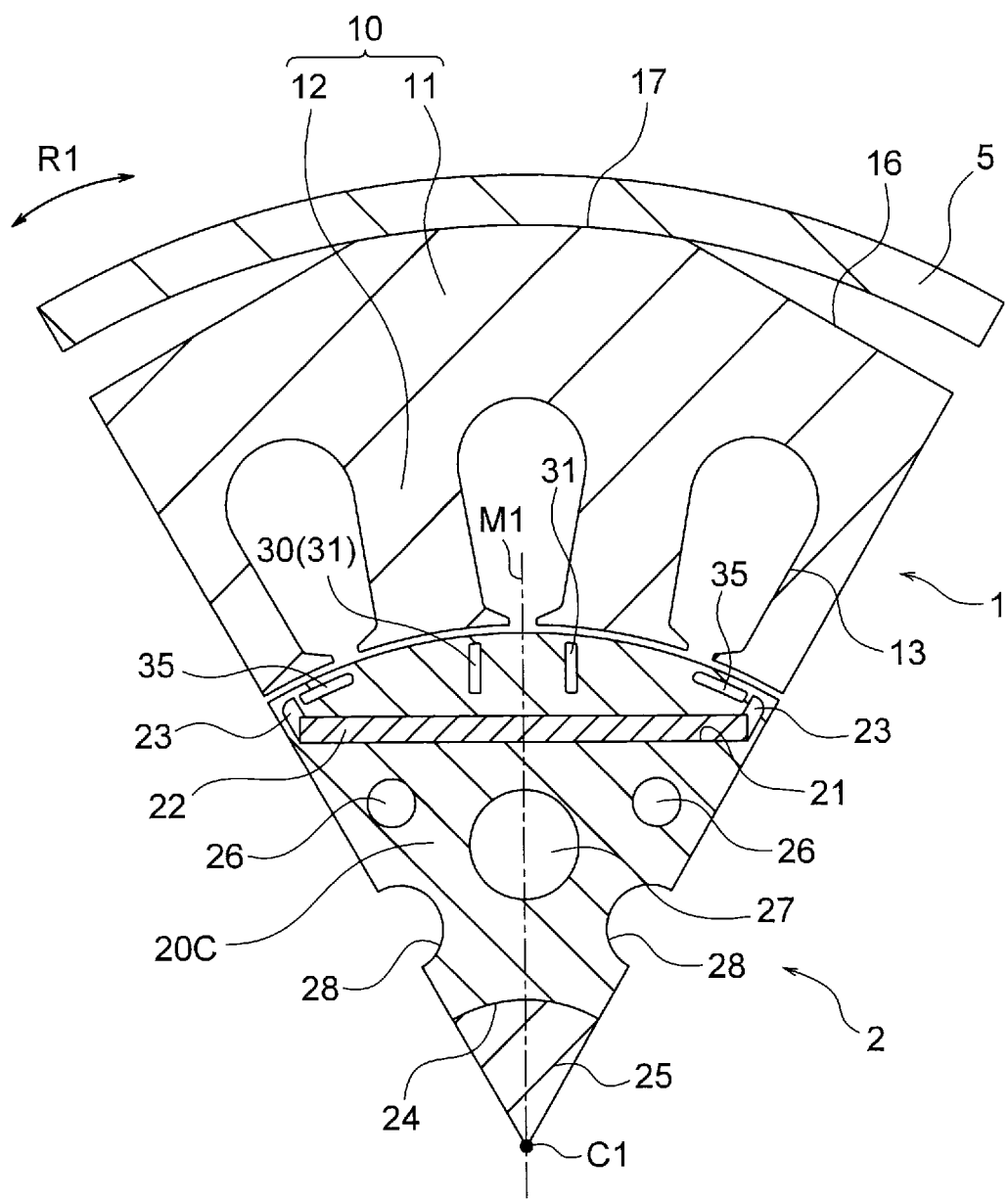
FIG. 14 is an enlarged cross-sectional view illustrating a part of a motor of a fourth embodiment.

Next, a fourth embodiment of the present invention will be described. FIG. 14 is a cross-sectional view illustrating a portion corresponding to one magnetic pole of a motor of the fourth embodiment. The motor of the fourth embodiment differs from that of the first embodiment in the number of slits per magnetic pole of a rotor core 20C.

Although the above-described rotor core 20 of the first embodiment has eight slits for each magnetic pole, the rotor core 20C of the second embodiment has two slits 31 for each magnetic pole. The two slits 31 are arranged at equal distances from the magnetic pole center line M1.

The two slits 31 extend parallel to the magnetic pole center line M1, but may be inclined with respect to the magnetic pole center line M1 as described in the second embodiment. In such a case, the two slits 31 are desirably inclined symmetrically with respect to the magnetic pole center line M1.

The two slits 31 have the uniform distance (denoted by T) to the magnet insertion hole 21, and this distance T satisfies 2.75≤T/G≤5.25.

The motor of the fourth embodiment is configured in a similar manner to the motor of the first embodiment except that the rotor core 20C has two slits 31 for each magnetic pole.

In the fourth embodiment, while the number of slits for each magnetic pole of the rotor core 20C is two, the slits 31 have the uniform distance T to the magnet insertion hole 21, and this distance T satisfies 2.75≤T/G≤5.25. Thus, the eddy current loss can be reduced as in the first embodiment.

In the first to fourth embodiments, the number of slits for each magnetic pole of the rotor core is eight or two, but it is sufficient that the number of slits is two or more.

Scroll Compressor

Figure 15:
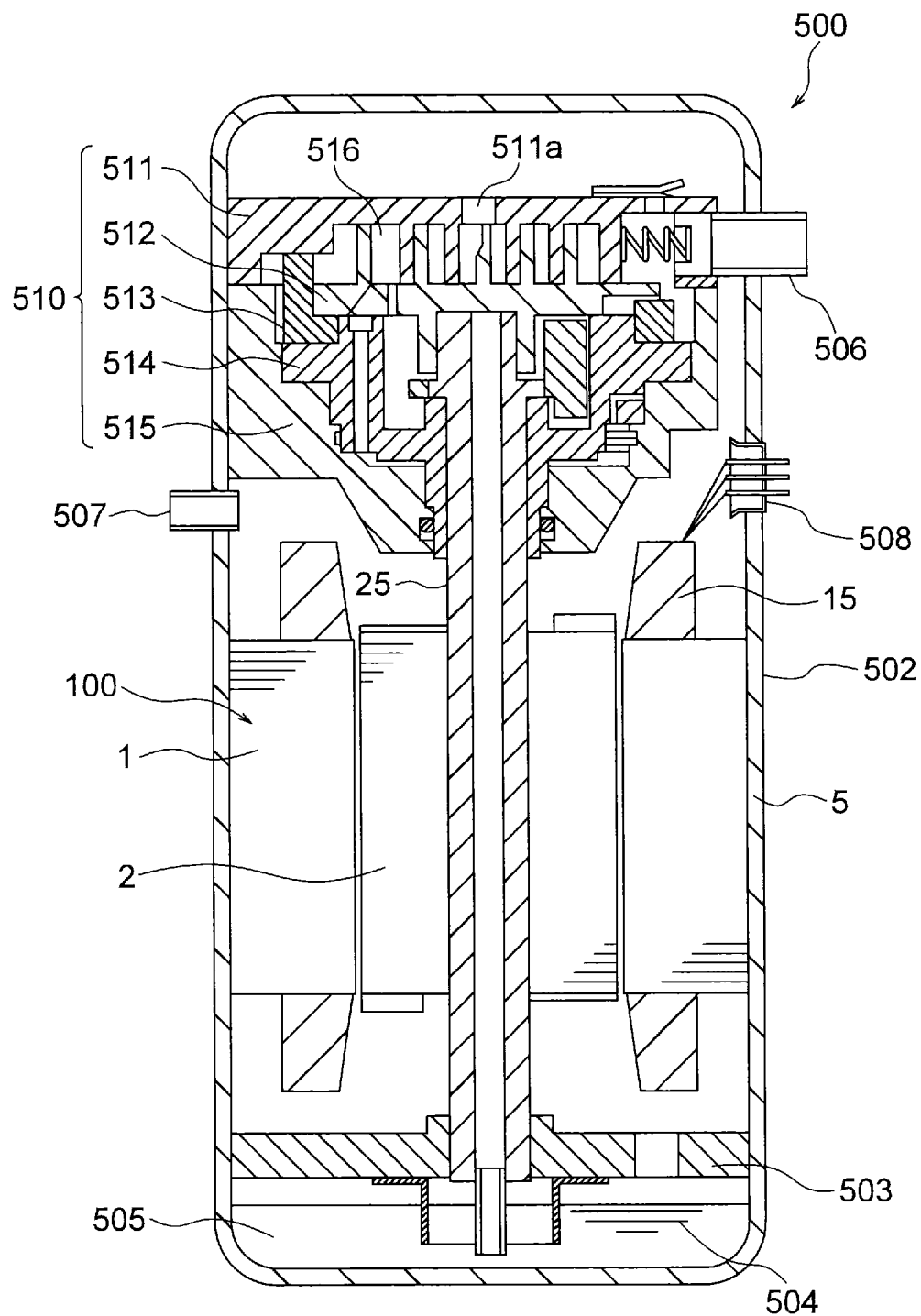
FIG. 15 is a diagram illustrating a compressor to which the motor of each embodiment is applicable.

Next, a compressor to which the motor of each embodiment described above is applicable will be described. FIG. 15 is a sectional view illustrating a configuration of the compressor 500 that includes the motor 100 of the first embodiment. Instead of the motor 100 of the first embodiment, the motors of the second to fourth embodiments may be used.

The compressor 500 is a scroll compressor and includes, in a container 502, a compression mechanism 510, the motor 100 that drives the compression mechanism 510, a main shaft 501 that connects the compression mechanism 510 and the motor 100, a sub-frame 503 that supports an end (a sub-shaft part) of the main shaft 501 opposite to the compression mechanism 510, and a lubricant 504 stored in an oil reservoir 505 at a bottom of the closed container 502.

The compression mechanism 510 includes a fixed scroll 511 and a swing scroll 512 combined together to form a compression chamber between their plate-like scroll teeth, an Oldham ring 513, a compliant frame 514, and a guide frame 515.

A suction pipe 506 passing through the container 502 is press-fitted to the fixed scroll 511. A discharge pipe 507 is provided so as to pass through the container 502. The discharge pipe 507 allows high-pressure refrigerant gas discharged from a discharge port 511a of the fixed scroll 511 to be discharged to the outside (a refrigeration cycle).

The container 502 has the cylindrical shell 5 into which the motor 100 is fitted by shrink-fitting. A glass terminal 508 for electrically connecting the stator 1 of the motor 100 to a drive circuit is fixed to the container 502 by welding.

The motor 100 of the first to fourth embodiments described above has the motor efficiency enhanced by reducing the eddy current loss. Thus, by using the motor 100 as a power source of the compressor 500, the operation efficiency of the compressor 500 can be enhanced, and consumption energy can be reduced.

Herein, the scroll compressor has been described as an example of the compressor, but the motor of each embodiment described above may also be applied to any compressor other than the scroll compressor.

Air Conditioner

Figure 16:
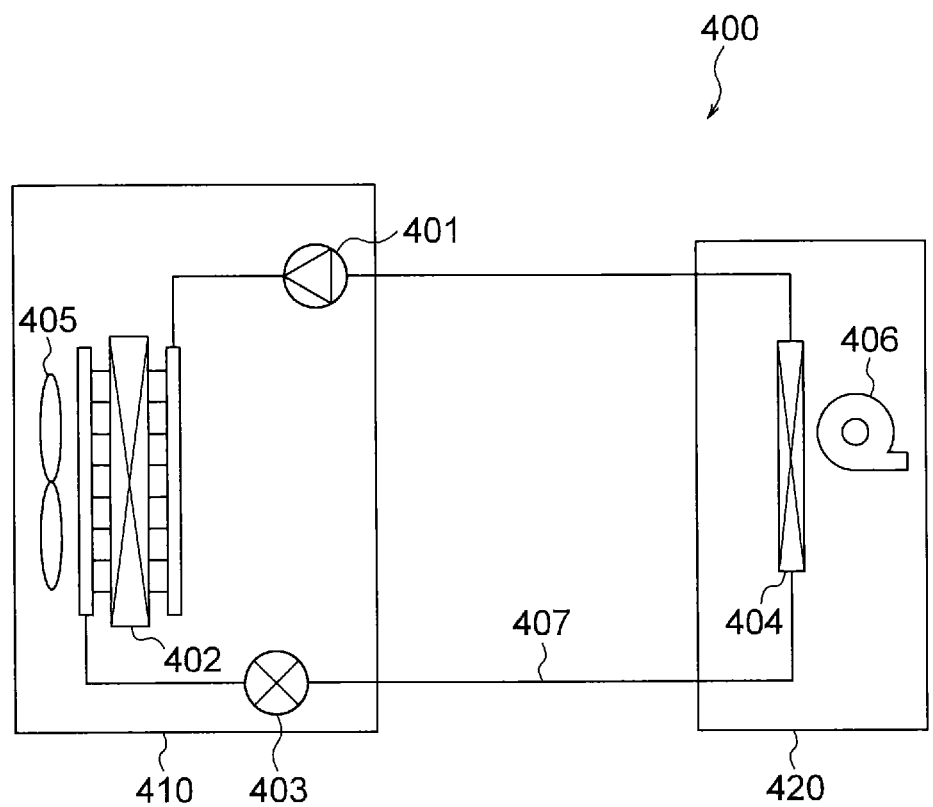
FIG. 16 is a diagram illustrating an air conditioner using the compressor of FIG. 15.

Next, an air conditioner 400 including the above described compressor 500 will be described. FIG. 16 is a diagram illustrating a configuration of the air conditioner 400. The air conditioner 400 illustrated in FIG. 16 includes a compressor 401, a condenser 402, a throttle device (decompressor) 403, and an evaporator 404. The compressor 401, the condenser 402, the throttle device 403, and the evaporator 404 are connected together by a refrigerant pipe 407 to constitute a refrigeration cycle. That is, the refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted of the compressor 500 illustrated in FIG. 15. The outdoor unit 410 is provided with an outdoor fan 405 that supplies outdoor air to the condenser 402. The evaporator 404 is provided in an indoor unit 420. The indoor unit 420 is provided with an indoor fan 406 that supplies indoor air to the evaporator 404.

The operation of the air conditioner 400 is as follows. The compressor 401 compresses sucked refrigerant and sends out the compressed refrigerant. The condenser 402 exchanges heat between the refrigerant flowing from the compressor 401 and the outdoor air to condense and liquefy the refrigerant, and sends out the liquefied refrigerant to the refrigerant pipe 407. The outdoor fan 405 supplies the outdoor air to the condenser 402. The throttle device 403 adjusts the pressure and the like of the refrigerant flowing through the refrigerant pipe 407 by changing its opening degree.

The evaporator 404 exchanges heat between the refrigerant brought into a low-pressure state by the throttle device 403 and indoor air to cause the refrigerant to take heat from the indoor air and evaporate (vaporizes), and then sends out the evaporated refrigerant to the refrigerant pipe 407. The indoor fan 406 supplies the indoor air to the evaporator 404. Thus, cooled air deprived of heat at the evaporator 404 is supplied into the room.

The motor 100 described in each of the first to fourth embodiments is applicable to the compressor 401 (the compressor 500 in FIG. 15). Thus, during operation of the air conditioner 400, the operation efficiency of the compressor 401 can be enhanced, and the operational stability can be enhanced.

The compressor 500 to which the motor of any one of the first to fourth embodiments is applied is not limited to the air conditioner 400 illustrated in FIG. 16 and may be used in other types of air conditioners.

Although the desirable embodiments of the present invention have been specifically described, the present invention is not limited to the above-described embodiments, and various modifications or changes can be made to these embodiments without departing from the scope of the present invention.

What is claimed is:

1. A motor comprising:
   a rotor rotatable about a rotation axis; and
   a stator surrounding the rotor so as to form an air gap between the stator and the rotor,
   wherein the rotor has a rotor core having a magnet insertion hole, and a rare earth magnet provided in the magnet insertion hole;
   wherein the rotor core has a plurality of slits on an outer side of the magnet insertion hole in a radial direction about the rotation axis, flux barriers at both ends of the magnet insertion hole in a circumferential direction about the rotation axis, and side slits each of which is formed between a corresponding flux barrier and the plurality of slits in the circumferential direction;
   wherein each of the plurality of slits has a length in the radial direction which is longer than a length in the circumferential direction;
   wherein each of the side slits has a length in the circumferential direction which is longer than a length in the radial direction;
   wherein the plurality of slits have a uniform minimum distance to the magnet insertion hole;
   wherein when the minimum distance is expressed as T and the air gap is expressed as G, $2.75 \leq T/G \leq 5.25$ is satisfied; and
   wherein a side slit minimum distance from the side slit to the magnet insertion hole is shorter than the minimum distance T.

2. The motor according to claim 1, wherein each of the plurality of slits extends parallel to a straight line in the radial direction passing through a center of the magnetic insertion hole in the circumferential direction.

3. The motor according to claim 1, wherein each of the plurality of slits extends to be inclined with respect to a straight line in the radial direction passing through a center of the magnetic insertion hole in the circumferential direction.

4. The motor according to claim 1, wherein the plurality of slits are formed symmetrically with respect to a straight line in the radial direction passing through a center of the magnetic insertion hole in the circumferential direction.

5. The motor according to claim 1, wherein an interval between two slits formed closest to a center of the magnet insertion hole in the circumferential direction among the plurality of slits is wider than an interval between other two adjacent slits among the plurality of slits.

6. The motor according to claim 1, wherein the plurality of slits are arranged at equal intervals in the circumferential direction.

7. The motor according to claim 1, wherein the rotor core has a through-hole passing through the rotor core in an axial direction.

8. The motor according to claim 7, wherein a diameter D of the rotor core and a distance H from the rotation axis to a center of the through-hole satisfies $D/4 \leq H$.

9. The motor according to claim 1, wherein the magnet insertion hole linearly extends perpendicularly to a straight line in the radial direction passing through a center of the magnetic insertion hole in the circumferential direction.

10. The motor according to claim 1, wherein the stator has a stator core and a winding wound on the stator core.

11. The motor according to claim 10, wherein the stator core has a through-hole passing through the stator core in an axial direction.

12. The motor according to claim 10, wherein the stator core has a cutout portion on an outer circumference of the stator core.

13. The motor according to claim 10, wherein the winding has a conductor made of copper or aluminum and an insulating film covering a surface of the conductor.

14. A compressor comprising:
    a container;
    a compression mechanism disposed in the container; and
    the motor according to claim 1 to drive the compression mechanism.

15. An air conditioner comprising a compressor, a condenser, a decompressor, and an evaporator,
    the compressor comprising:
    a container;
    a compression mechanism disposed in the container; and
    the motor according to claim 1 to drive the compression mechanism.

16. The motor according to claim 1, wherein a crimping portion is formed between two slits closest to a center of the magnet insertion hole in the circumferential direction among the plurality of the slits.

* * * * *